US005158632A

United States Patent [19]

Colson et al.

[11] Patent Number: 5,158,632

[45] Date of Patent: Oct. 27, 1992

[54] METHOD OF MAKING AN EXPANDABLE AND COLLAPSIBLE WINDOW COVERING

[75] Inventors: Wendell B. Colson; Paul G. Swiszcz, both of Boulder; Jim Anthony, Denver, all of Colo.; Cees M. Jansen, Woudrichem, Netherlands

[73] Assignee: Hunter Douglas Inc., Upper Saddle River, N.J.

[21] Appl. No.: 597,466

[22] Filed: Oct. 15, 1990

[51] Int. Cl.$^5$ .............................................. B32B 31/08

[52] U.S. Cl. .................................... 156/197; 156/200; 156/204; 156/256; 156/311; 160/84.1; 428/116; 428/188; 428/181

[58] Field of Search ............... 156/197, 204, 200, 256, 156/311; 160/84.1; 428/179, 181, 188, 116

[56] References Cited

U.S. PATENT DOCUMENTS

| | | | |
|---|---|---|---|
| 2,803,578 | 8/1957 | Holland | 154/122 |
| 2,874,612 | 2/1959 | Luboshez | 88/60 |
| 4,288,485 | 9/1981 | Suominen | 428/116 |
| 4,347,887 | 9/1982 | Brown | 160/368 |
| 4,424,849 | 1/1984 | Robertson | 160/84.1 X |
| 4,450,027 | 5/1984 | Colson | 156/197 X |
| 4,631,217 | 12/1986 | Anderson | 428/118 |
| 4,846,243 | 7/1989 | Schneider | 160/84.1 |
| 5,043,038 | 8/1991 | Colson | 156/197 |
| 5,090,098 | 2/1992 | Seveik et al. | 160/84.1 X |

FOREIGN PATENT DOCUMENTS 6706563 11/1968 Netherlands .

*Primary Examiner*—Michael W. Ball
*Assistant Examiner*—Michele K. Yoder
*Attorney, Agent, or Firm*—Fleit, Jacobson Cohn, Price Holman & Stern

[57] ABSTRACT

An expandable and collapsible window covering is disclosed in which an unpleated facing fabric is attached to a pleated panel to provide a Roman shade type window covering. Transverse cells are formed by the attachment of the pleated panel and unpleated fabric which provide excellent insulation properties. A method for making such a shade is also disclosed.

9 Claims, 7 Drawing Sheets

METHOD OF MAKING AN EXPANDABLE AND COLLAPSIBLE WINDOW COVERING

FIELD OF THE INVENTION

This invention relates to an expandable and collapsible window covering. More particularly, this invention relates to a window covering of the Roman shade type wherein one side of the shade, typically arranged so that this side is toward the interior of the room, consists of a number of horizontal parallel curved surfaces, and in which each of these curved surfaces forms the front wall of a tubular cell extending transversely across the width of the shade, thus creating a thermal insulating window covering with an extremely attractive appearance.

BACKGROUND OF THE INVENTION

Several publications show cellular shades, wherein a fabric material is formed to define parallel tubular cells extending horizontally across the width of the shade. Air within each of the cells only circulates minimally, such that when expanded the shade provides good thermal insulation.

It is, of course, desirable to make the physical appearance of the shade as attractive as possible. Similarly, it is desirable to make such shades as economically as possible, which requires both that a minimal amount of material be used to form each cell and that the manufacturing process be as expeditious as possible.

Various exemplary prior art disclosures include the following:

Netherlands patent application No. 6706563 to Landa discloses a screen wherein a plurality of strips of a fabric material are folded about fold lines extending longitudinally and bonded together, the two edges of each strip being bonded to the center of the next successive strip, to form a screen consisting of a plurality of tubular cells. The Landa screen is intended to be used such that the cells extend vertically.

U.S. Pat. No. 4,347,887 to Brown shows a "thermal shutter". A wide band of material is folded transversely to form a double column of adjacent cells, which may have rounded visible contours. The cells are adhesively bonded to one another. The Brown structure is symmetrical, so that both sides of the shade thus formed have essentially the same appearance.

U.S. Pat. No. 4,450,027 to Colson shows a method and apparatus for fabricating a multiple cell shade wherein a continuous relatively narrow strip of fabric is folded longitudinally in order to define pleats in the shade material and the edges folded over on the center portion to create a tubular cell. Successive cells are assembled by applying an adhesive to folded over edges of the cells, and adhering each cell to the preceding cell when wound on a stacking rack.

U.S. Pat. No. 4,631,217 to Anderson shows in FIG. 3 a shade of asymmetrical construction. A rear wall section of each cell is essentially straight or linear when the shade is in its expanded position. The width of these rear wall sections thus defines the spacing of the adjacent cells, while the front of each cell, containing more material, presents a pleated outward appearance.

The Anderson patent also discloses a method of forming an expandable and collapsible shade consisting of an assembly of horizontally parallel cells, in which the cell structure is formed from a material folded into a Z-shape rather than from a U-shape as shown in the Colson patent.

U.S. Pat. No. 4,846,243 to Schneider shows a foldable window covering formed of a wide material folded transversely, as in the Brown patent, to yield a collapsible shade. The front surface of the shade consists of a number of drooping loops formed by doubling the material back on itself. The successive cells are spaced in the expanded position of the shade by a relatively vertical rear wall section of each cell.

Roman shades are often preferred by consumers for their smooth and uncreased but drooping appearance to the room interior. While the disclosures cited above provide shades which may be commercially producible in relatively high volume, only Schneider shows a Roman shade type shade. However, the Schneider shade is formed of a wide strip of material folded transversely, which limits the width of the shade which can be formed to the width of the stock material available. Also, the application of adhesive lines in the transverse direction on fabrics is problematic in that straight lines are difficult to achieve. A significant drawback to traditional Roman shades is that they generally must be jobbed out to seamstresses and take significantly longer and often cost more to make than the various pleated shades disclosed above.

SUMMARY OF THE INVENTION

Therefore, it is an object of the invention to provide a Roman shade consisting of a number of parallel generally tubular cells, each having a front wall formed of a relatively drooping soft material which is essentially uncreased in the finished product, providing an aesthetically pleasing appearance, while the rear wall of each cell is essentially linear when the shade is in the expanded state, such that the width of the rear wall determines the spacing of adjacent cells and holds the front wall from being pulled flat.

It is also an object of the invention to provide a method for making Roman shades which is easily adapted to the use of custom fabrics.

It is a further object of the invention to provide a Roman shade which can be manufactured using essentially automated methods and apparatus.

These and other objects of the invention, which will be apparent to those skilled in the art, are met by the present invention. The window covering according to the invention comprises an expandable and collapsible pleated panel made up of a stack of longitudinally folded strips bonded one on top of another with the longitudinal folds forming transverse pleats of said pleated panel. An unpleated fabric is adhesively bonded to the pleated panel transversely across the width of the panel at uniformly spaced intervals with respect to the pleats of the panel. The length of unpleated fabric extending between said spaced intervals is greater than the spacing of the intervals when the window covering is fully expanded. To further enhance the operation and appearance of the window covering according to present the present invention, the longitudinal folds may be sharp, permanently set and creased folds.

Each of the stacked parallel cells is made up of a rear wall having a first portion joined to a second, middle portion by a pleat directed outwardly with respect to the cell and third portion joined to the second, middle portion by a pleat directed inwardly with respect to the cell. The first portion of the rear wall is an integral extension of the third portion of the next lower cell in the stack. Each cell also has a front wall of drooping fabric adhesively bonded to the rear wall along the extremity of the third portion opposite the middle portion and along the extremity of the first portion opposite the middle portion. These bond points generally define the extent of the cell rear wall.

The method for forming an expandable and collapsible window covering such as a Roman shade according to the present invention generally comprises the following steps. First a continuous flat tubular material having longitudinal folds and a longitudinal central portion between said folds is provided A first adhesive material is applied to the tubular material longitudinally along its central portion. A second, hot-melt adhesive material is also applied in at least one bead spaced outwardly toward the longitudinal folds from the first adhesive material The hot-melt adhesive hardens before the subsequent stacking step. Next the continuous tubular material is stacked by winding it onto a rack that has elongated flat surfaces in order to form a stack of adjacent layers of tubular material. The first adhesive material adheres one layer to another to form a unitary stack of tubular members on the flat surfaces. A straight section of the unitary stack is cut away from the remainder of the stacked tubular material and removed from the rack. The removed section of tubular material is cut longitudinally along the center of the tubular layers to create two panels of single pleated material. Finally, a flat facing fabric is bonded to the pleated panel with the bead of hot-melt adhesive by feeding the pleated panel over a support member at a first rate and feeding the flat facing fabric at a second rate greater than the rate of the pleated panel and activating the hot-melt adhesive with a heat seal bar pressing the layers against a backup bar.

BRIEF DESCRIPTION OF THE DRAWINGS

The invention will be better understood if reference is made to the accompanying drawings, in which.

DESCRIPTION OF THE PREFERRED EMBODIMENTS

Expandable and collapsible window coverings such as Roman shades are produced according to the present invention by utilizing and adding to the methods disclosed in U.S. Pat. No. 4,450,027 to Colson, which patent is incorporated herein by reference thereto. Additional steps of the present invention comprise applying additional longitudinal hot-melt glue lines, cutting the cellular shade obtained thereby into two single pleated panels to form a base material and attaching a fabric face to the base material.

Figure 1:
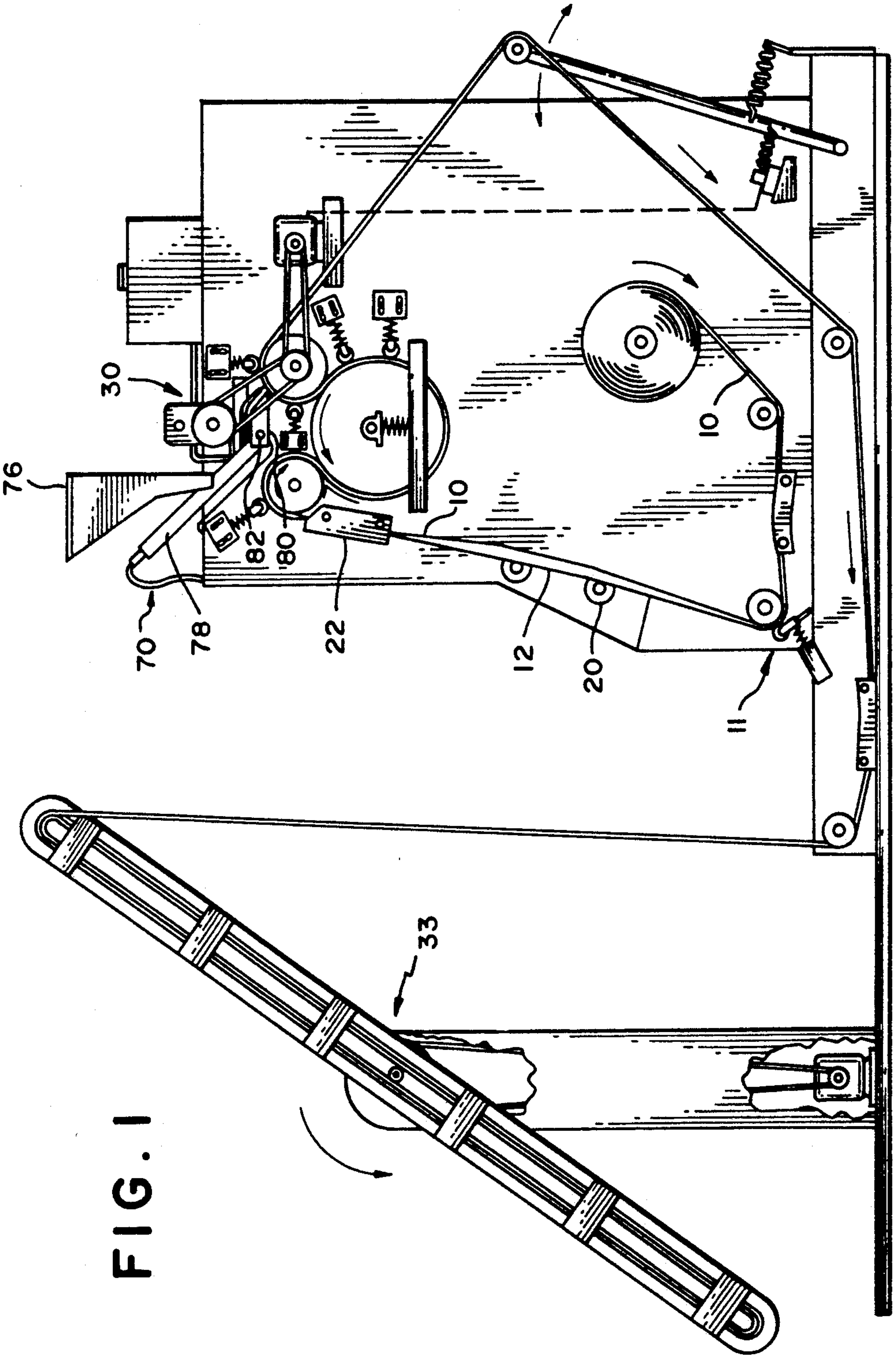
FIG. 1 is an elevational view of the apparatus for forming the folded cellular structure of the present invention.
Figure 2:
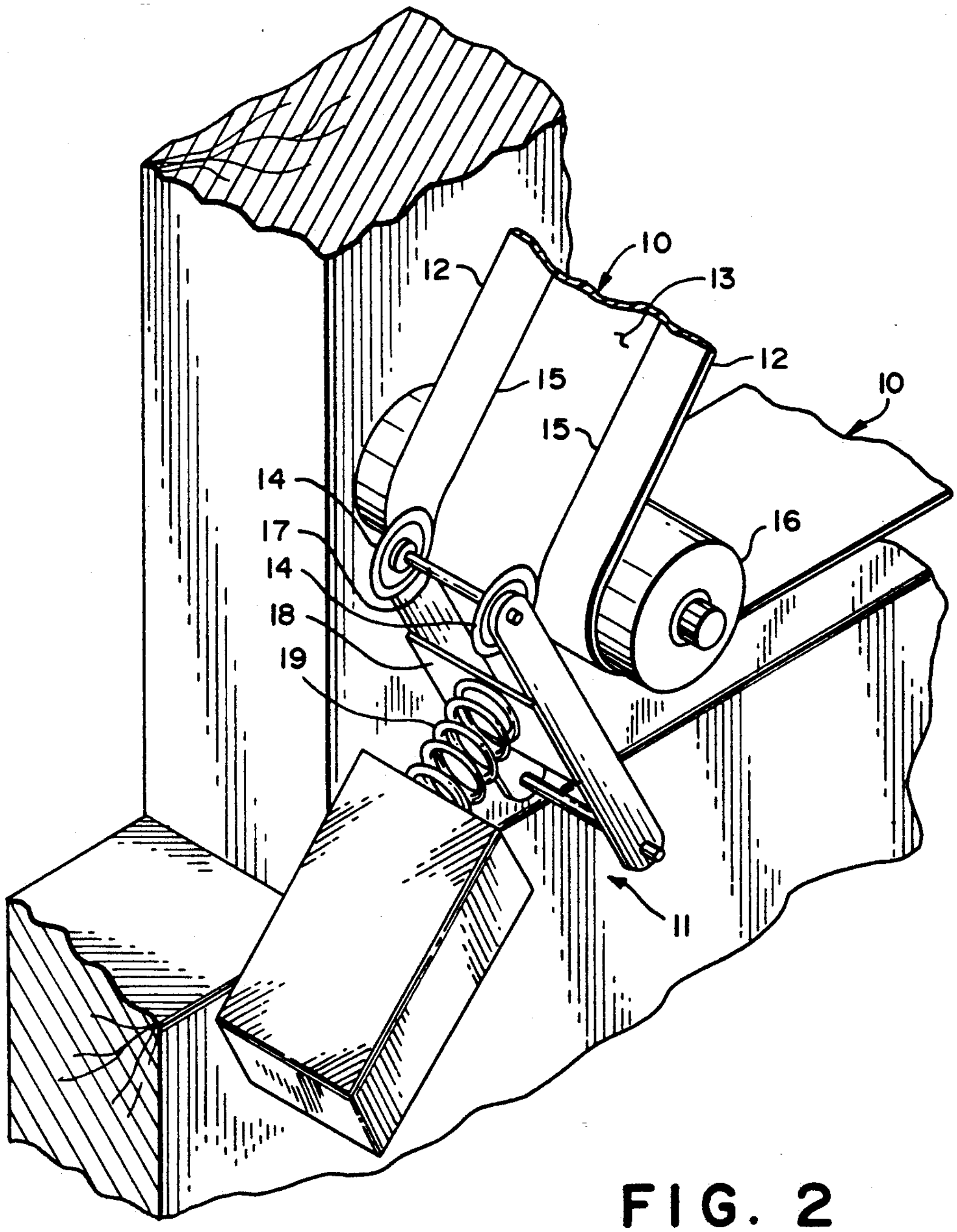
FIG. 2 is a perspective view of the initial creasing assembly of the apparatus shown in FIG. 1.
Figure 3:
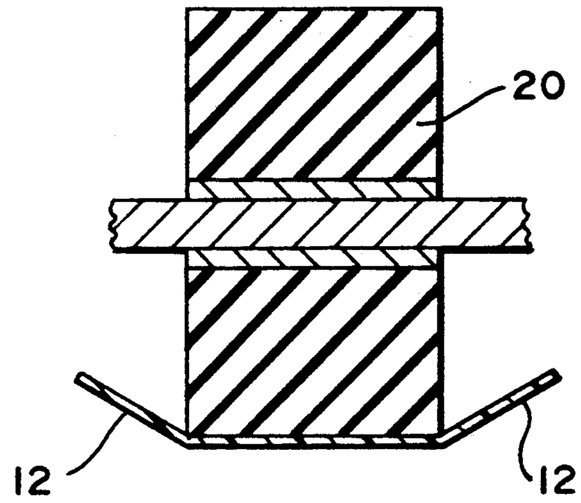
FIG. 3 is a cross-sectional view of a folding roller of the apparatus shown in FIG. 1.
Figure 4:
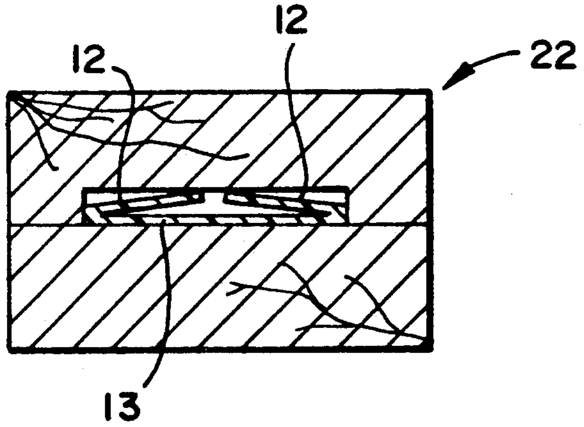
FIG. 4 is a cross-sectional view of a folding die of the apparatus shown in FIG. 1.
Figure 5:
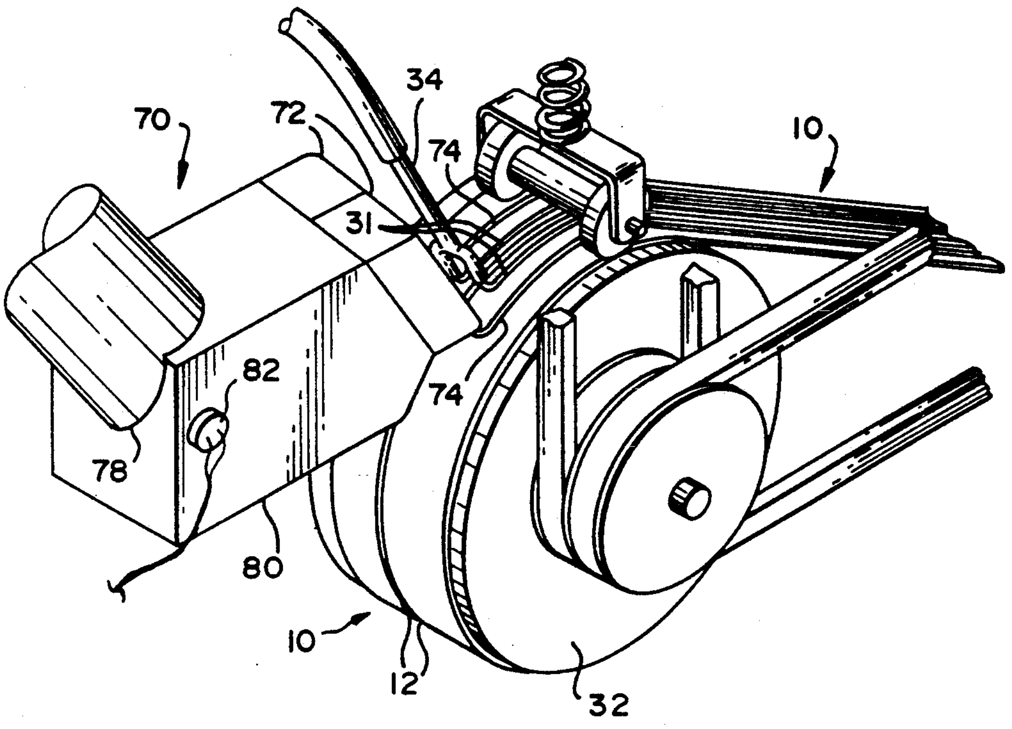
FIG. 5 shows a perspective view of the portion of the apparatus of FIG. 1 for application of adhesive to form the cellular structure.

FIGS. 1 through 5 illustrate steps used in the basic method for manufacturing cellular shades according to the Colson '027 patent. FIGS. 1 and 5 also illustrate part of the additional apparatus and method steps necessary for the present invention. A continuous strip of material 10 is drawn through a series of steps which result in its edges 12 being folded over the central portion 13, so that they approach each other closely near the middle of the strip. As FIG. 2 shows, a creaser assembly 11 includes a pair spaced-apart creaser wheels 14 that are pressed against strip material 10 as it is drawn around a roller 16. The creaser wheels are mounted on an axle 17 which is itself mounted on a pivotal arm assembly 18, and are kept pressed against the shade material 10 by a spring 19 which exerts force against the arm assembly. The folds occur along crease lines 15.

The initial creasing prepares the strip material for the folding process shown in FIGS. 3 and 4. After creasing, the material 10 is drawn around roller 20 and through folding die 22 to fold over the edges 12 of strip material 10.

Once folded, an adhesive applicator assembly 30 applies adhesive to the strip material in order to subsequently bond layers of the folded strip material together. As shown in FIG. 5, as the strip material 10 is drawn around a roller 32, adhesive material is dispensed in beads 31 from an applicator 34 onto the material 10. Motor drive belts 36 may be used to drive the roller 32 to assist in drawing the shade material 10. Preferably, the adhesive is dispensed at a rate proportional to the seed at which the shade material 10 is drawn past, so that a like amount of adhesive is applied regardless of the manufacturing rate. Two beads 31 of the adhesive are continuously dispensed, one each adjacent to the edges 12 of the shade material 10. The strips of material 10 are then stacked by winding on rotating rack 33. The width of adhesive beads 31 may be adjusted as necessary to achieve an adequate bead in a particular application.

In addition to the adhesive applicator assembly 30, disclosed in the Colson '027 patent, the present invention utilizes a hot melt adhesive applicator assembly 70. Nozzles 72 apply two beads 74 of hot-melt adhesive to the folded strip material 10, outside of adhesive beads 31. The hot-melt adhesive beads 74 quickly harden so that when the material 10 is subsequently stacked hot-melt adhesive beads 74 do not bond together adjacent fabric layers.

The hot-melt adhesive is initially provided in the form of pellets in hopper 76, shown in FIG. 1. The pellets fall into pneumatic cylinder 78 in which a piston is pneumatically powered to force the pellets into heating block 80 where they are melted. Contained within block 80 is a second positive displacement gear pump for pumping the melted hot-melt adhesive to nozzles 72 a constant rate relative to the strip material 10 speed.

In order to prevent yellowing of the hot-melt adhesive, which can occur from remaining in a melted state for prolonged periods, only a small amount of adhesive is melted by heating block 80 just before it is applied. An electric heating element 82 provides the heat necessary to melt the adhesive. A preferred adhesive for this application is copolyester hot-melt adhesive which melts at about 250° F.

After the application of adhesive materials, the shade material 10 is stacked so that the folded edge portions 12 of one strip are adhesively bonded by adhesive beads 31 to the central portion 13 of the next strip. According to the methods disclosed in the Colson '027 patent, the strip material is wound on a rotating elongated rack 33. The stacked assembly of strips thus curves around the ends of the rack. When the stack is complete, the curved ends of the stack are cut off, leaving two cellular structures on either side of the rack.

Figure 6:
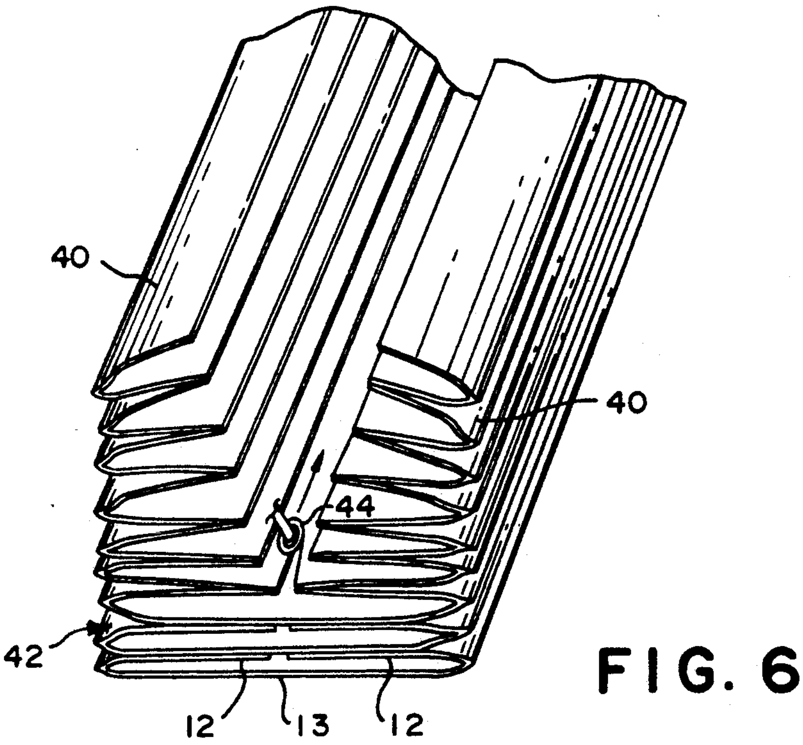
FIG. 6 shows a perspective view of a layered cellular structure being separated into two pleated panel base materials according to the present invention.

The present invention adds the further additional step of cutting the stacked material longitudinally down its central portion 13, between the folded side portions 12 yielding two pleated panel base materials 40, as shown in FIG. 6. A preferred method of cutting the cellular stack 42 to obtain the two panels employs a rotating, circular knife blade 44. However, any basic cutting tool can be used, even a simple hand-held knife. These pleated panels are then used as a base material for the Roman shades according to the present invention.

Figure 7:
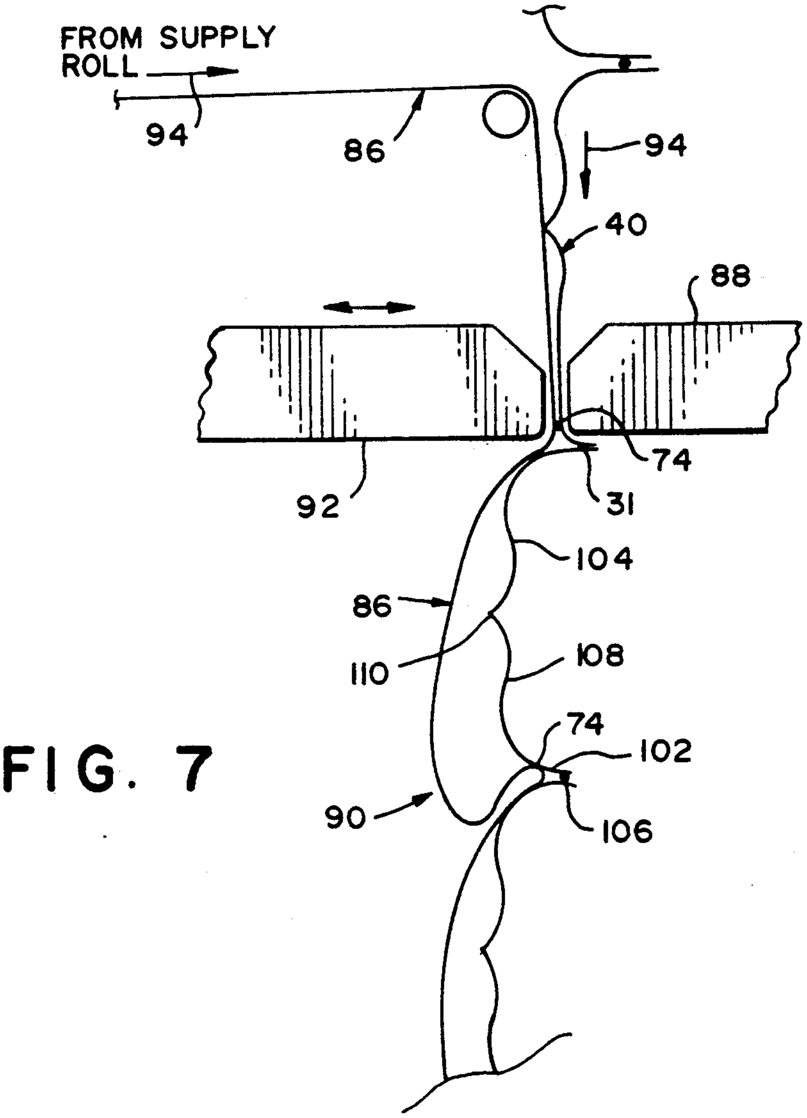
FIG. 7 is a schematic diagram illustrating the step of bonding the facing material to the base material according to the present invention.

FIG. 7 illustrates the attachment of the facing fabric 86 to the pleated panel base material 40. The base material 40 is expanded and fed over a back-up bar 88. The facing fabric 86 is fed from a supply roll to a position adjacent the base material 40. When the appropriate amount of facing fabric 86 has been fed to create the loops 90 which provide the characteristic droopy appearance of the Roman shade, a heat seal bar 92 moves forward to press the facing fabric 86 against the hot melt adhesive bead 74 and create an adhesive bond. Loops 90 may be formed by feeding the facing fabric at a slightly faster rate than the base material 40. The combined temperature and pressure exerted by the heat seal bar 92 melts adhesive bead 74 and forces it into the fibers of facing fabric 86 to create a secure bond. The heat seal bar 92 is then removed and hot-melt adhesive bead 74 quickly hardens to permanently bond together the base material 40 and facing fabric 86.

Arrows 94 in FIG. 7 indicate the direction of travel of the base material 84 and facing fabric 86. If the size of the loops 90 desired is large it may be necessary to feed both materials upside down from their normal orientation as a Roman shade as illustrated in FIG. 7. This causes the loops 90 to naturally fall out of the way of the bond areas at adhesive beads 74. It should be readily appreciated by those skilled in the art that the heat seal bar 92 may be fully automated or, alternatively, may be a hand held and operated device.

Furthermore, the hot-melt adhesive method of bonding this facing fabric 86 to the base material 40 is only a preferred embodiment of the present invention. The facing fabric 86 could also be fastened to the base material 40 by other means such as a clip system attached to the base material or simply by sewing the two layers together. As such, the disclosure of the preferred embodiment herein is not intended to limit the scope of the invention.

Figure 9:
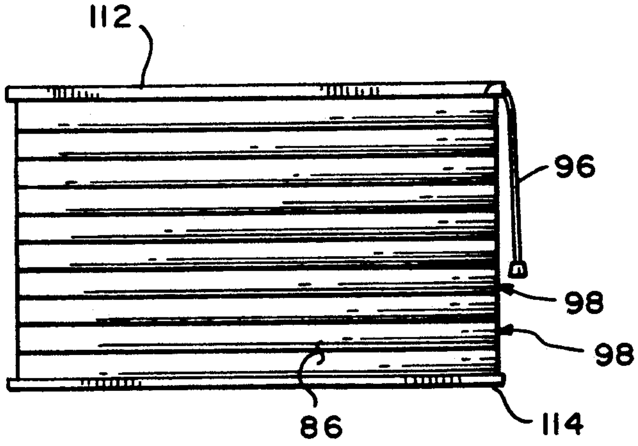
FIG. 9 is a front elevational view of a Roman shade according to the present invention.
Figure 8:
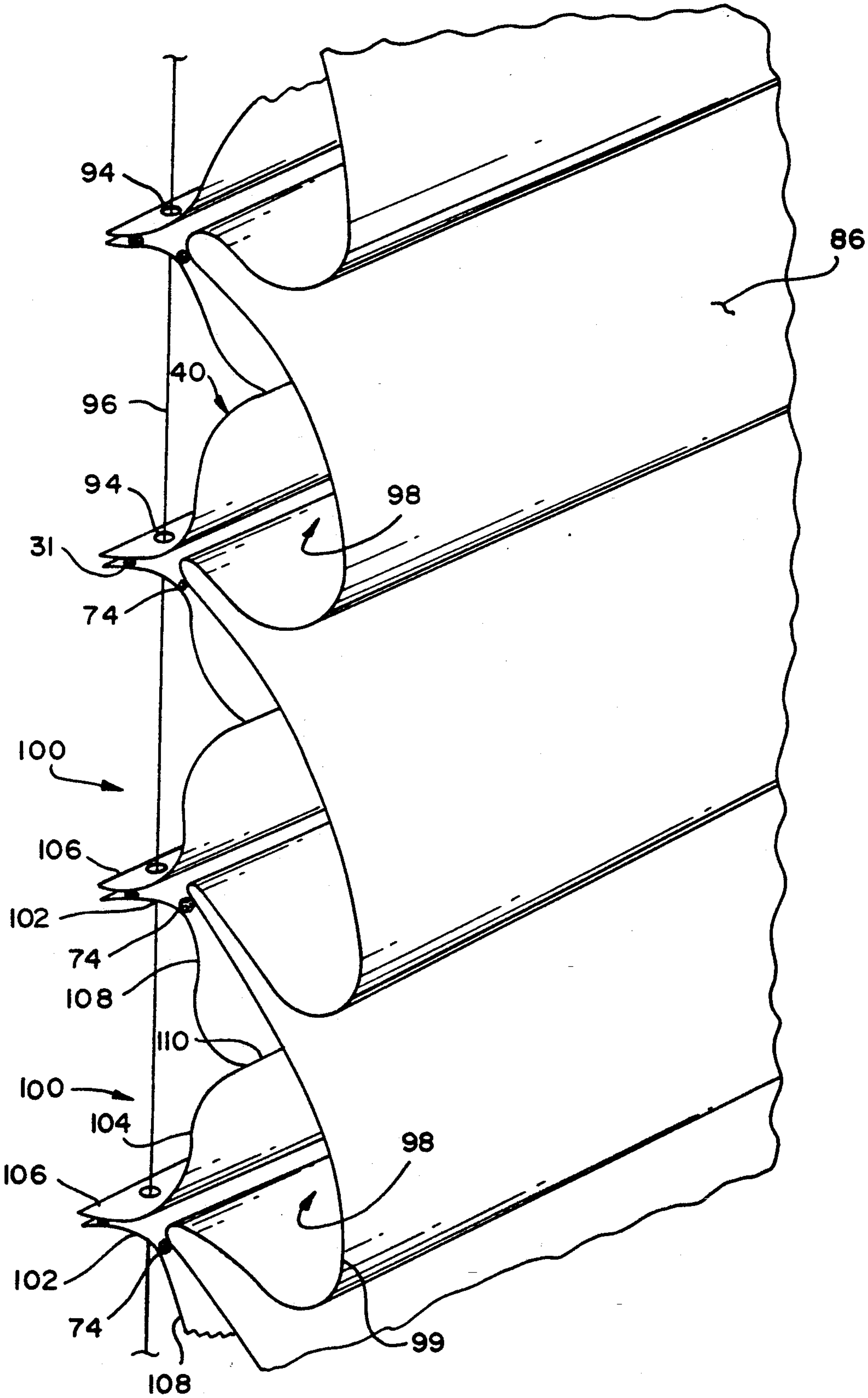
FIG. 8 is a partial perspective end view of a finished Roman shade according to the present invention.

A finished Roman shade according to the present invention is shown in FIGS. 8 and 9. Holes 94 have been provided for the passage of a lift cord 96 through the base material 40. The number of lift cords 96 required for a particular shade will depend upon the shade width. The base material 40 forms a pleated panel which is the back of the shade. The facing fabric 86 provides a smooth, droopy appearance for the front of the shade. Transverse cells 98 are defined by the facing fabric 86 and the base material 84, bonded together at the hot melt adhesive beads 74 above and below each cell 98.

Individual cells 98 comprise a front wall 99 and a rear wall 100 which has three portions: a first portion 102 is joined to a second, middle portion 104 by rearwardly directed pleat 106 and third portion 108 is joined to the second, middle portion 104 by a forwardly directed pleat 110. It can be seen that first portion 102 and third portion 108 of the cell below are integral with one another and separated only by hot-melt adhesive beads 74 which define the extent of the rear wall of each cell. When fully expanded, the rear wall 100 of each cell 98 is essentially vertical and remains of shorter height than the cell front wall 99 formed by the facing fabric 86. Therefore, even in the fully expanded position, the shade maintains its characteristic droopy front appearance. Transverse cells 98 also provide excellent insulating properties for the Roman shade according to the present invention. To complete the shade, a head rail 112 and bottom rail 114 are added as shown in FIG. 9.

Figure 10:
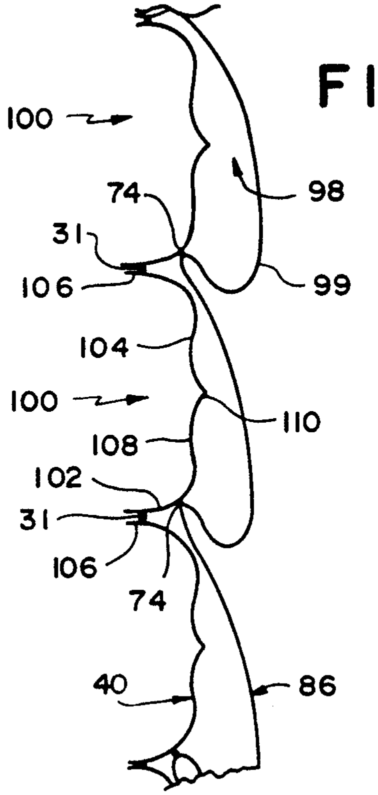
FIG. 10 is an end view of an alternative embodiment of a Roman shade according to the present invention.
Figure 12:
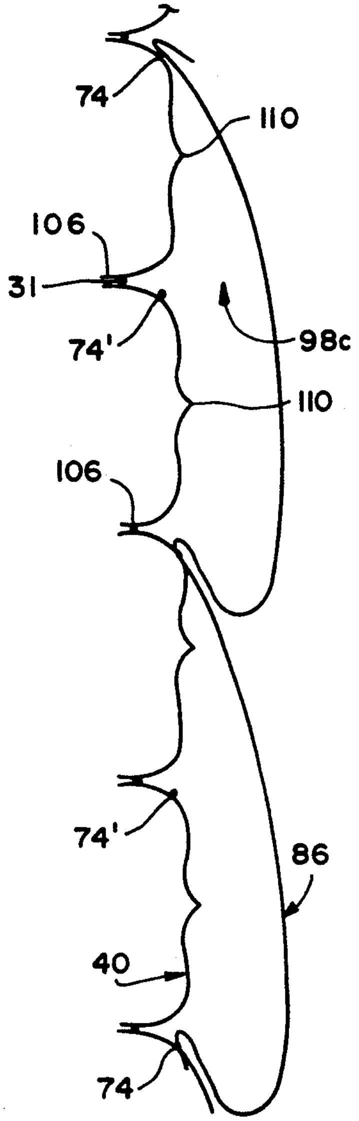
FIG. 12 is an end view of a third possible embodiment according to the present invention.
Figure 11:
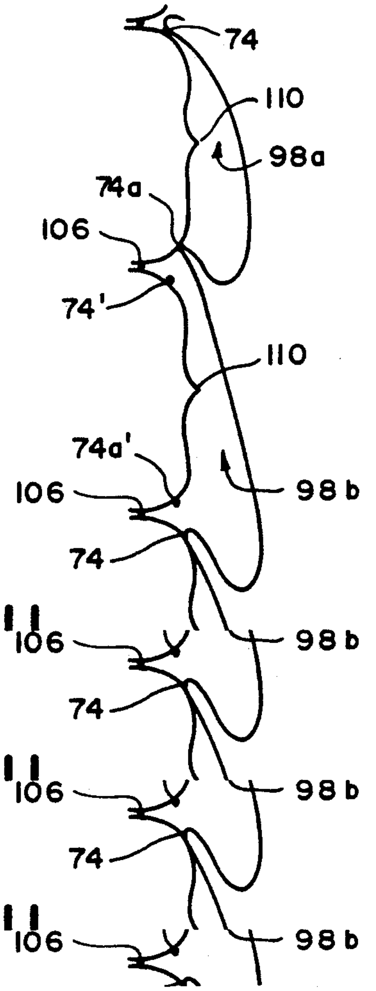
FIG. 11 is an end view of a second possible alternative embodiment according to the present invention.

FIGS. 10, 11 and 12 illustrate alternative embodiments of a window covering according to the present invention. The embodiment illustrated in FIG. 10 is substantially the same as in FIG. 8 except that it is inverted in deployment. Therefore the general arrangement of cells 98 with respect to front wall 99, rear wall 100 and first, second and third rear wall portions 102, 104 and 108 is the same as explained above with respect to FIG. 8.

FIG. 11 illustrates an embodiment in which the facing fabric 86 is attached to the pleated panel base material 40 at periodically varied intervals in order to provide first and second transverse cells **98*a*, 98*b* of different size in the longitudinal direction of the window covering. To create this embodiment a second hot-melt adhesive bead 74*a* is applied to the flat tubular material on the opposite side from the first hot-melt adhesive bead 74. Cells of the first type 98*a* are formed by attaching facing fabric 86 to both adhesive beads 74 and 74*a* on the associated pleated panel section. This provides first cells 98*a* with only an inwardly directed pleat 110. Cells of the second type 98*b* thus have one inwardly directed pleat 110 and two outwardly directed pleats 106. Adhesive beads 74' and 74*a*'** remain unused.

FIG. 12 illustrates an embodiment of the present invention having relatively larger cells **98*c*, formed on the same base material 40 as in the previous embodiments. To form the embodiment shown in FIG. 12, every other adhesive bead 74' is skipped in the attachment of facing fabric 86. This provides each cell 98*c* with two inwardly directed pleats 110 and two outwardly directed pleats 106**. It should be apparent that additional adhesive beads may be skipped to provide even larger cells as desired.

An important aspect of the present invention is the ease with which custom Roman shades can be made. The cellular structure from which the base material 40 is made need not be made in any particular size because the base material is cut from it to suit the particular window to be covered. Therefore, the cellular structure may be produced in relatively large widths, limited only by the size of rotating rack 33, to provide efficient, high volume production. Also, using the same base material 40, a fabricator may choose from a wide range of facing fabrics 86 because no special preparation of the facing fabric is required.

The description of the preferred embodiments contained herein is intended in no way to limit the scope of the invention. As will be apparent to a person skilled in the art, modifications and adaptions of the structure, method and apparatus of the above-described invention will become readily apparent without departure from the spirit and scope of the invention, the scope of which is defined in the appended claims.

What is claimed is:

1. A method for making an expandable and collapsible window covering, comprising:

forming an expandable and collapsible pleated panel having a plurality of pleats defined by parallel folds projecting in the same direction, said pleated panel having a first side and a second side and said folds projecting from said first side of said pleated panel; and attaching a flat facing fabric to one of said first and second sides of said pleated panel at periodically spaced attachment points with the length of said facing fabric extending between adjacent attachment points being sufficiently greater than the distance between said attachment points so that said facing fabric droops from one attachment point to beyond an adjacent attachment point when said pleated panel is expanded.

2. The method according to claim 1, wherein the attachment of the facing fabric is continuous across the width of the pleated panel, thereby forming a plurality of stacked, closed transverse cells.

3. The method according to claim 1, wherein the step of forming a pleated panel comprises:

providing a continuous flat tubular material having longitudinal edge folds and a longitudinal central portion between said folds;

applying a first adhesive material to said tubular material longitudinally along said central portion;

stacking the continuous tubular material to form a stack of adjacent layers of said tubular material;

allowing said first adhesive material to adhere one layer to another to form a unitary stack; and cutting a section of the unitary stack away from the remainder of the stacked tubular material to form a pleated panel.

4. The method according to claim 3, further comprising:

forming the continuous flat tubular material by continuously folding a continuous length of flat strip material at diametrically opposite sides into a flat tubular form; and permanently setting and creasing said continuous folds by heat treating and cooling the flat tubular material under constant pressure and tension.

5. The method according to claim 3, further comprising cutting the cut away section of tubular material longitudinally along the center of the tubular layers to create two panels of single pleated material prior to attaching the flat facing fabric.

6. The method according to claim 5, further comprising applying a second, hot-melt adhesive material in at least one bead spaced outwardly from said first adhesive material.

7. The method according to claim 6, wherein the step of attaching flat facing fabric comprises the steps of:

expanding and feeding one single pleated panel over a support member at a first rate, said member being positioned on the opposite side of the panel from the bead of hot-melt adhesive;

feeding a flat facing fabric at a second rate greater than said first rate, with said fabric fed adjacent the pleated panel on the same side as the bead of hot-melt adhesive; and bonding the flat facing fabric to the pleated panel by pressing the facing fabric, the pleated panel and said hot-melt adhesive bead between the support member and a moveable heated member.

8. A method for making an expandable and collapsible window covering, comprising providing a continuous flat tubular material having longitudinal folds and a longitudinal central portion between said folds;

applying a first adhesive material to said tubular material longitudinally along said central portion;

applying a second, hot-melt adhesive material in at least one bead spaced outwardly from said first adhesive material;

stacking the continuous tubular material to form a stack of adjacent layers of said tubular material;

allowing said first adhesive material to adhere one layer to another to form a unitary stack;

cutting a section of the unitary stack away from the remainder of the stacked tubular material to form a double pleated panel;

cutting said double pleated panel longitudinally along the center of the tubular layers to create two panels of single pleated material;

feeding one single pleated panel over a support member at a first rate, said member being positioned on the opposite side of the panel from the bead of hot-melt adhesive;

feeding a flat facing fabric at a second rate greater than said first rate, with said facing fabric adjacent the single pleated panel on the same side as the bead of hot-melt adhesive; and bonding the flat facing fabric to the pleated panel by pressing said facing fabric, pleated panel and hot-melt adhesive bead between the support member and a heated member, whereby the length of facing fabric applied between each adjacent bead of hot-melt adhesive being greater than the distance between said beads when said pleated panel is expanded.

9. The method according to claim 8, further comprising attaching the expandable and collapsible window covering to at least one rigid support member and providing means for raising and lowering said window covering.

* * * * *